US 6,676,742 B2

(12) United States Patent
Gilli

(10) Patent No.: US 6,676,742 B2
(45) Date of Patent: Jan. 13, 2004

(54) MIXTURE THAT CAN BE ADDED TO DECORATIVE AQUEOUS-PHASE PAINT PRODUCTS

(75) Inventor: Alberto Gilli, Andezeno (IT)

(73) Assignee: Candis S.R.L., Andezeno (IT)

( * ) Notice: Subject to any disclaimer, the term of this patent is extended or adjusted under 35 U.S.C. 154(b) by 72 days.

(21) Appl. No.: 10/157,133

(22) Filed: May 30, 2002

(65) Prior Publication Data

US 2003/0177951 A1 Sep. 25, 2003

(30) Foreign Application Priority Data

Mar. 19, 2002 (IT) ................ TO2002A000243

(51) Int. Cl.⁷ .............. C09D 5/29; C09D 5/00
(52) U.S. Cl. ........... 106/464; 106/18.32; 106/18.33; 106/18.34; 106/18.35; 106/164.5; 106/164.51; 106/204.01; 106/204.03; 106/287.1; 106/287.17; 106/400; 106/461; 106/465; 106/801; 106/803; 106/805; 106/811; 106/812; 106/814; 106/817
(58) Field of Search .............. 106/403, 18.32, 106/18.33, 18.34, 18.35, 164.5, 164.51, 204.01, 204.03, 287.1, 287.17, 400, 461, 465, 801, 803, 805, 811, 812, 814, 817

(56) References Cited

U.S. PATENT DOCUMENTS

| 2,880,104 A | 3/1959 | Scholl |
| 3,458,328 A | 7/1969 | Zola |
| 3,929,692 A | * 12/1975 | Offerman ................ 524/44 |
| 4,769,405 A | 9/1988 | Kondo et al. |
| 4,820,754 A | 4/1989 | Negri et al. |
| 5,338,349 A | 8/1994 | Farrar |

FOREIGN PATENT DOCUMENTS

| CA | 2040065 A | 10/1991 |
| WO | WO 93/15153 A | 8/1993 |
| WO | 91/85642 | * 11/2001 |

OTHER PUBLICATIONS

Derwent Abstract No. 1992–000169, abstract of Canadian Patent Specification No. 2040065 (Oct. 1991).*

* cited by examiner

Primary Examiner—Anthony J. Green
(74) Attorney, Agent, or Firm—Sughrue Mion, PLLC

(57) ABSTRACT

A physical and chemical mixture of aggregative material, chemical products, mineral fillers and/or special pigments in dispersion, with metallic effect, designed to be added to aqueous-phase paint products having a monochromatic-flocculate or multichromatic-flocculate base (known among decorative paint products by the trade name of aqueous-phase Multicolor, Antiche Terre Fiorentine and/or the like), or aqueous-phase paint products without flocculate components (known among decorative paint products by the trade name of Arteacqua glazings and/or the like) in order to obtain a newly devised single-color and multicolor mural-coating decorative paint product both, with and without metallized effect, which can be applied using a spatula, paintbrush, glove and/or roller or the like, and a process for the production thereof.

20 Claims, No Drawings

MIXTURE THAT CAN BE ADDED TO DECORATIVE AQUEOUS-PHASE PAINT PRODUCTS

FIELD OF THE INVENTION

The present invention relates in general to mural decorations.

More in particular, the present invention regards a physical and chemical mixture of aggregative material, chemical products, mineral fillers and/or special pigments in dispersion, with metallic effect, which, once mixed together, either totally or in part, in well-defined proportions, can be added in certain percentages to already existing water-based decorative paint products with monochromatic or multichromatic flocculate components (for instance, those going by the trade name of water-based Multicolor, Antiche Terre Fiorentine and/or the like), or aqueous-phase paint products without flocculate components, such as the so-called semi-coverings or glazings (for instance, those going by the trade name of Arteacqua and/or the like), transforming their use, decorative appearance, and/or mode of application on the wall.

SUMMARY OF THE INVENTION

The innovative idea is that of achieving a new decorative appearance, so enabling the creation of a mural coating that has not hitherto appeared on the national or international markets, aimed both at the private user and at the professional decorator.

Another important and innovative aspect is the application of the aforesaid final product, which can be applied in a single coat on a wall surface appropriately treated with a white or coloured primer or undercoat to obtain a monochromatic, two-colour, or multicolour final decorative product also having metallic effects (the term "metallic" meaning, in the present context, a metallized effect and/or an iridescent effect and/or a pearly effect). It is likewise possible, again in a single coat, to obtain the preponderance of one colour over another colour or the preponderance of the metallic effect over the colour or vice versa, this being made possible, with extreme ease and flexibility, by the purpose of the present patent, i.e., the mixture of aggregative material, chemical products and mineral fillers, this mixture being referred to hereinafter, for reasons of simplicity, as mixture "A", simply added by mechanical mixing to the paint products already described previously.

If it is desired to obtain the metallic effect, it is advisable to prepare a predispersion of the particular metallic pigment (referred to hereinafter as predispersion In what follows, the aforesaid predispersion "B" will possibly be added, by mechanical mixing, to the paint products previously referred to.

The decorative painting effects, which are truly innovative, obtained with the invention of the mixture "A" in association with the already commercially available products, has enabled an advance in the current state of the art, moreover simplifying considerably the work of application of the products. It is sufficient to consider that certain decorative painting effects, in the current state of the art, are obtained on walls only by means of multiple coats of paint, with an expenditure in terms of time and materials, and, hence, with enormous costs and with the possibility, in view of the complexity of application, of mistakes and final poor appearance.

DETAILED DESCRIPTION OF THE INVENTION

In what follows, there is the formulation of ingredients making up the mixture "A".

The aforesaid ingredients are to be understood as expressed in weight percentages (wt %), as also in the case of other formulations appearing herein, in the absence of other indications.

As has already been explained, the purpose of the invention, i.e., of mixture "A", is that of enabling application in a single coat of a new decorative painting effect, by combining mixture "A" with painting products already available on the market. For this purpose, it is necessary, for the ingredients that will be described in what follows to be present in the mixture "A".

An Anchoring Agent

The said anchoring agent acts as a bridge or interface between the final decorative coating and the wall, thus guaranteeing a firm and permanent adhesion to the substrate.

As anchoring agent, it is possible to use, for instance, one comprised in the following group, or mixtures thereof:
A) calcium silicate or metasilicate;
B) aluminium silicate (kaolin);
C) magnesium silicate (talc);
D) diatomaceous earth;
E) aluminium silicate calcinated at approx. 1000° C. (calcinated kaolin).

The amount of anchoring agent forming part of mixture "A" may range between 5 wt % and 30 wt %.

A Structuring Agent

This enables a perfect applicability of the final decorative coating, in so far as it guarantees adequate slip and spreadability during application, at the same time increasing, once the coating has been applied on the wall. resistance to abrasion and to the formation of cracks.

As structuring agent, it is possible to use, for instance, one comprised in the following group, or mixtures thereof:
A) polyethylene/cellulose-based fibres;
B) water-insoluble cellulose fibres;
C) wood fibres;
D) water-insoluble fine cellulose powder.

The amount of structuring agent forming part of mixture "A" may range between 3 wt % and 21 wt %.

A Filling Agent

This enables the final decorative coating to assume body and thickness, facilitating its application and creating, together with the anchoring agent, the right degree, once drying is complete, of opacity and cover.

As filling agent, it is possible to use, for instance, one comprised in the following group, or mixtures thereof:
A) semi-amorphous calcium carbonate;
B) rhombohedral, crystalline calcium carbonate (calcite);
C) precipitated calcium carbonate with an acicular or rhombohedral structure;
D) amorphous calcium carbonate;
E) magnesium hydrosilicate with laminar structure in natural combination with calcium-magnesium carbonate;
F) crystalline calcium carbonate precipitated with spheroidal particles;
G) coated calcium carbonate.

The amount of filling agent forming part of mixture "A" may range between 5 wt % and 25 wt %.

A Reinforcing Agent

This enables the final decorative coating to assume greater structural hardness, bestowing on the applied film consistency and greater resistance to possible impact, together with, at the same time, a good transpirability.

As reinforcing agent, it is possible to use, for instance, one comprised in the following group, or mixtures thereof:

A) hydrated magnesium and aluminium silicate (mica);
B) siliceous sand;
C) coalescence of mica, quartz and chlorite (hydrated magnesium-aluminium silicate).

The amount of reinforcing agent forming part of mixture "A" may range between 8 wt % and 50 wt %.

The aforementioned products within the various categories can be used either individually or mixed together in order to optimize the desired characteristics of the finished product. For instance, it is possible to adjust the product's viscosity, opacity, thixotropic features, applicability, etc. Mixing of the various components in the appropriate weight percentages is carried out in special mixers for dry powders.

The various ingredients are thus put in the mixer and are then mechanically mixed until a homogeneous mixture is obtained, which is ready for the subsequent working steps.

Once it has been prepared, the mixture "A" will be added to the products already mentioned, in order to obtain the final decorative product. This addition will be carried out under slow mechanical mixing.

The established amount of aqueous-phase paint product is then put into a special container. The container is then positioned under a disperser which has a butterfly impeller driven by a motor with speed variator, and the previously prepared mixture "A" is added under slow and continuous stirring.

The proportions of addition between the aqueous-phase paint products and the mixture "A" may vary as follows:

aqueous-phase paint products: from 25 wt % to 85 wt %;
mixture "A": from 75 wt % to 15 wt %;

to obtain the final product, which can be applied with a spatula, glove, or the like.

In order to obtain the final product, which can be applied with a roller, paintbrush, or the like, the proportions between the aqueous-phase paint product and the mixture "A" could vary even beyond the parameters given above, in order to adapt the viscosity of the final product to the various applicational requirements.

It is, likewise, possible to add the individual ingredients making up the mixture "A" in the desired and established proportions directly in the aqueous-phase paint products.

Also in this case, the procedure will be to put the established amount of aqueous-phase paint product into a special container.

The above container will next be positioned under a disperser equipped with a butterfly impeller driven by a motor with speed variator, and under slow and continuous stirring, the various ingredients forming the mixture "A", in the correct and desired percentages, are added one by one.

Both in the former case (addition in a single go of the mixture "A") and in the case where the various ingredients of the mixture "A" are introduced one by one into the aqueous-phase paint products, there is obtained, at the end of the addition and of the mixing process, the final product, which is ready to be put into tins or similar containers.

The above product has a whitish, soft, pasty and slightly thixotropic appearance, suitable for applications with a spatula, and presents an opaque appearance after it has been applied and has dried.

The product in question can be easily coloured with predispersed pigments until all the desired shades of colour are obtained, such as to meet the requirements of a possible reference colour card or satisfy the creative demands of decorators and designers.

It will be up to the manufacturer to make available the ready-to-use whitish or coloured product in appropriate tins or other containers.

As pigments compatible with the system proposed, it is possible to use organic or inorganic pigments in predispersed form, toners, colorimetric bases, universal colouring agents, and/or the like.

The aforesaid colouring or pigment bases will be added to a hundred parts of finished product, as described, in a proportion ranging from one part to 60 parts, according to the desired colour and the desired intensity of shade (lighter or darker).

An opaque coloured final product will thus be obtained, which, thanks to the innovative contribution of the mixture "A" as described herein, will be transformed, in habitual use, in application, in colour, and in its intrinsic chemical/physical nature, with the added advantage of enabling a considerable saving in terms of time required for application on the wall, and hence, in practice, will lead to an economic advantage for the end user, achieving, together with this, an excellent and altogether original decorative result.

In this connection, it is sufficient, for example, to consider any white flocculate-based and/or variously coloured water-based product which, in order to express its decorative properties, has to be applied by spraying.

The above spraying process implies the need to work with the aid of complex spraying equipment, which comprises, at the very least, a compressor for compressed air, a paint gun with appropriate nozzle and appropriate air mixing, with very precise and well-determined pressure values, as well as the additional need to cover up and mask various objects, as well as the door-frames and window-frames of the room that is to be painted, in order to prevent any damage or paint smears, all these factors entailing a consequent waste of time and money.

The advance in the state of the art is now made possible thanks to the addition of the mixture "A" or the predispersion "B", described hereinafter (if it is desired to create the metallic effect), to the product with any type of aqueous-phase flocculate base, but also to any type of known product, such as glazings and/or the like in order to achieve the possibility of creating a new easy-to-apply coloured product with high decorative value, which can be applied using a spatula.

It is likewise readily understandable that it is possible in this way to prepare finished products ready for application which present innumerable different chromatic shades, the said products being the same as regards their chemical nature, but with different colourings.

The above-mentioned opaque, coloured, finished products may be easily applied using a plastic spatula in a single coat as just one colour or, again in a single coat, with a number of colours set on the spatula at the same time, thus creating on the wall a polychrome decorative effect, maintaining their own intrinsic characteristics of colour and opacity unaltered and constant.

As mentioned previously, we shall now examine in greater detail the composition and the amounts, expressed in weight percentages (wt %), of the predispersion "B".

The purpose of the predispersion "B", which forms part of the invention is, then, to bring into dispersion the particular metallic pigments which, once predispersed, can be regularly added, in the desired proportions, to the aqueous-phase paint products (any flocculate-based paint product and/or any product of the glazing type), thus creating a new decorative product with multiple metallic effects, which may be different in colour and/or in intensity of shade.

The predispersion "B", which is selectively usable in combination/union with the mixture "A" is made up of an aqueous-phase base, in which the metallic pigment will be dispersed by means of mechanical stirring.

The predispersion "B" comprises the following ingredients, which will be described hereinafter.

Water as required

A Preserving Agent

This enables the predispersion "B" and, consequently, the subsequent finished product to maintain its chemico-physical characteristics unaltered, so preventing proliferation of possible bacterial attack.

As preserving agent, it is possible to use, for instance, one comprised in the following group, or mixtures thereof:
  A) mixture of 5-chloro-2-methyl-4-isothiazolin-3-one and 2-methyl-4-isothiazolin-3-one;
  B) mixture of chlorinated isothiazolinone and non-chlorinated isothiazolinone with the addition of hemiformal;
  C) solution of derivatives of isothiazolinone, 12-hydroxy-5,8,11-trioxydodecane, 1,3-bis-(hydroxymethyl), urea, 1,6-dihydroxy-2,5-dioxyhexane;
  D) 1-(3-chloroallyl)-3,5,7-triazo-1-azonio-adamantane chloride.

The amount of preserving agent forming part of the predispersion "B" may range between 0.3 wt % and 3 wt %.

An Antifoaming Agent

This enables the predispersion "B" to be free from foam both while it is being worked and after the work is finished, moreover preserving the final product from foam during application on the wall.

As antifoaming agent, it is possible to use, for instance, one comprised in the following group, or mixtures thereof:
  A) paraffin mineral oils in combination with hydrophobic polysiloxane polyether copolymer;
  B) emulsions of modified polysiloxane;
  C) modified polyalkoxyethers in paraffin oil;
  D) emulsions of a hydrophobic polysiloxane polyether copolymer.

The amount of antifoaming agent forming part of the predispersion "B" may range between 0.1 wt % and 1.2 wt %.

A Thickening Agent

This enables the predispersion "B" to assume an optimal viscosity for the subsequent pigment dispersion, further ensuring that the finished product will present anti-drip and gripping properties which are indispensable for a good application of the finished product.

As thickening agent, it is possible to use, for instance, one comprised in the following group, or mixtures thereof:
  A) hydrophobically modified non-ionic hydroxyethyl cellulose polymer;
  B) hydroxypropylmethyl cellulose;
  C) hydrophilic colloidal xanthan gum;
  D) sodium carboxymethyl cellulose.

The amount of thickening agent forming part of the predispersion "B" may range between 0.5 wt % and 5 wt %.

A Metallic Pigment

This will bestow on the predispersion "B" and, hence, on the finished product metallic reflections and effects in the range of gold, silver, copper, and bronze, in all the possible shades of the chromatic range and intensity of colour.

As metallic pigments, it is possible to use, for instance, ones comprised in the following group, or mixtures thereof:
  A) metallic pigment of the gold type with fine particles;
  B) metallic pigment of the silver type with fine particles;
  C) metallic pigment of the gold type with large particles;
  D) metallic pigment of the silver type with large particles;
  E) metallic pigment of the copper type;
  F) metallic pigment of the bronze type.

The amount of metallic pigment forming part of the predispersion "B" may range between 1 wt % and 36 wt %.

A Wetting Agent

This enables complete development, control of viscosity, and increase in compatibility in the system of the metallic pigment.

As wetting agent, it is possible to use, for instance, one comprised in the following group, or mixtures thereof:
  A) solution of an alkyl ammonium salt of a polyfunctional polymer;
  B) solution of an unsaturated polycarboxylic acid of high molecular weight;
  C) solution of a polycarboxylic acid with a silicone polymer;
  D) polyglycol esters of fatty acids;
  E) ammonium salts of a polyacrylic acid of low molecular weight.

The amount of wetting agent forming part of the predispersion "B" may range between 0.1 wt % and 1.5 wt %.

A Dispersing Agent

This enables maintenance of the stability of the predispersion "B", at the same time preventing the formation of hard deposits at the bottom of the paint, which can no longer be dispersed.

As dispersing agent, it is possible to use, for instance, one comprised in the following group, or mixtures thereof:
  A) sodium salts of polycarboxylic acids;
  B) ammonium salts of a carboxylic acid;
  C) aminomethyl propanol;
  D) acrylic linear polymers.

The amount of dispersing agent forming part of the predispersion "B" may range between 0.1 wt % and 1.5 wt %.

The aforementioned products within the various categories forming the predispersion "B" can be used either individually or mixed together, the aim being to adapt the predispersion "B" and consequently the final metallized product to the various requirements of application and/or decoration.

Mixing of the various components forming the predispersion "B" in the desired weight percentages is carried out with the aid of a mechanical dispersor equipped with a butterfly impeller.

The correct amount of water is introduced into an appropriate steel container. The container is then set under the disperser equipped with butterfly impeller, and moderate stirring is commenced.

In order, the following are added to the water: the preserving agent, the antifoaming agent, the wetting agent, and the dispersing agent. Stirring proceeds again at a moderate rate for three to four minutes. Then the thickening agent is added, and the rate of stirring is accordingly slightly increased.

When the solution is thickened, the metallic pigment is introduced in the desired amount, and stirring continues at a sustained rate for 10 to 15 minutes until the predispersion "B" presents a complete homogeneity.

Once it has been prepared, the predispersion "B" is added to the aqueous-phase paint products already mentioned, of the flocculate-based type in aqueous phase of any type, or to any type of glazing.

To do this, the desired amount of aqueous-phase paint product is introduced into an appropriate container. The said container is then positioned under a disperser equipped with a butterfly impeller driven by a motor with speed variator, and the previously prepared predispersion "B" is added under slow and continuous stirring.

The proportions of addition between the aqueous-phase paint products and the predispersion "B" may vary as follows:

aqueous-phase paint products: from 25 wt % to 85 wt %;

predispersion "B": from 75 wt % to 15 wt %;

to obtain the final metallized product, which can be applied with a spatula, glove, or the like.

In order to obtain the final metallized product, which can be applied with a roller, paintbrush, or the like, the proportions between the aqueous-phase paint product and the predispersion "B" could vary even beyond the parameters given above, in order to adapt the viscosity of the final metallized product to the various applicational requirements.

At the end of the above addition and mixing process, a final metallized product is obtained, which is ready to be put into tins or similar containers.

The above product has a pasty appearance with metallic reflections.

The finished metallized product in question can easily be coloured using predispersed pigments until all the desired shades of colour are obtained.

It will be up to the manufacturer to make available the final metallized product, either pigmented or non-pigmented, in appropriate tins or other containers.

As pigments compatible with the system proposed, it is possible to use organic or inorganic pigments in predispersed form, toners, calorimetric bases, universal colouring agents, and/or the like.

The aforesaid colouring or pigment bases will be added to a hundred parts of finished metallized product as described, in a proportion ranging from one part to 25 parts according to the desired colour and the desired intensity of shade.

A coloured metallized final product will thus be obtained, which, thanks to the innovative contribution of the predispersion "B" as described herein, will lead to a newly devised decorative paint being obtained.

As has already been said, both the final product deriving from the mixture "A", which forms the subject of the present patent, and the final product with metallized effect deriving from the predispersion "B", which also is the subject of the present patent, can readily be applied using different tools for application, such as a glove, a spatula, a paintbrush, or the like, in a single coat.

It is likewise possible, once again in a single coat, to apply, at the same time, both the opaque final product (deriving from the mixture "A") and the metallized final product (deriving from the predispersion "B"). For example, if it is desired to apply the product using a spatula, it is possible to put an amount of opaque finished product and an amount of metallized finished product side by side on the same spatula, thus creating, with a simple and single application, a new effect having considerable decorative properties.

Provided in what follows are a number of explanatory examples regarding the formulations of the mixture "A" and the predispersion "B", as well as the corresponding additions thereof to the aqueous-phase paint products and their subsequent pigmentation. The amounts are expressed in weight percentages.

|  | (wt %) |
|---|---|
| Example 1: formulation of mixture "A" | |
| Anchoring agent (diatomaceous earth) | 5–30 |
| Structuring agent (water-insoluble cellulose fibres) | 3–21 |
| Filling agent (rhombohedral, crystalline calcium carbonate) | 5–25 |
| Reinforcing agent (siliceous sand) | 8–50 |
| Example 2: addition of mixture "A" to aqueous-phase paint product | |
| Flocculate-based multicolour product in aqueous phase | 25–85 |
| Mixture "A" | 75–15 |
| Example 3: addition of mixture "A" to aqueous-phase paint produce | |
| Glazing | 25–85 |
| Mixture "A" | 75–15 |
| Example 4: addition of pigment paste to the product deriving from base "A" | |
| Multicolour product or glazing | 25–85 |
| Mixture "A" | 75–15 |
|  | 100 |
| Pigment paste | 1–60 |
| Example 5: formulation of predispersion "B" | |
| Water | as required |
| Preserving agent (mixture of chlorinated isothiazolinone and non-chlorinated isothiazolinone with the addition of hemiformal) | 0.3–3 |
| Antifoaming agent (emulsion of modified polysiloxane) | 0.1–1.2 |
| Wetting agent (solution of an unsaturated polycarboxylic acid of high molecular weight) | 0.1–1.5 |
| Dispersing agent (sodium salts of polycarboxylic acids) | 0.1–1.5 |
| Thickening agent (hydrophilic colloidal xanthan gum) | 0.5–5 |
| Metallic pigment (silver with fine particles) | 5–36 |
| Example 6: addition of predispersion "B" to aqueous-phase paint product | |
| Product having a base of any type of flocculate and/or glazing | 25–85 |
| Predispersion "B" | 75–15 |
| Example 7: addition of pigment paste to the product deriving from predispersion "B" | |
| Multicolour product or glazing | 25–85 |
| Predispersion "B" | 75–15 |
|  | 100 |
| Pigment paste | 1–25 |

What is claimed is:

1. An aqueous-phase decorative paint additive, comprising:
   an anchoring agent comprising at least one selected from the group consisting of:
   A) calcium silicate or metasilicate;
   B) aluminium silicate;
   C) magnesium silicate;
   D) diatomaceous earth; and
   E) aluminium silicate calcinated at approx. 1000° C.; or mixtures thereof;
   a structuring agent comprising at least one selected from the group consisting of:
   A) polyethylene/cellulose fibers;
   B) water-insoluble cellulose fibers;
   C) wood fibers; and
   D) water-insoluble fine cellulose powder; or mixtures thereof;
   a filling agent comprising at least one selected from the group consisting of:

A) semi-amorphous calcium carbonate;
B) rhombohedral, crystalline calcium carbonate;
C) precipitated calcium carbonate having an acicular or rhombohedral structure;
D) amorphous calcium carbonate;
E) magnesium hydrosilicate having a laminar structure in natural combination with calcium-magnesium carbonate;
F) crystalline calcium carbonate precipitated with spheroidal particles; and
G) coated calcium carbonate; or mixtures thereof; and a reinforcing agent comprising at least one selected from the group consisting of:
A) hydrated magnesium and aluminium silicate;
B) siliceous sand; and
C) coalescence of mica, quartz and chlorite; or mixtures thereof.

2. The additive according to claim 1, comprising said anchoring agent in an amount between 5 wt % and 30 wt %.

3. The additive according to claim 1, comprising said structuring agent in an amount between 3 wt % and 21 wt %.

4. The additive according to claim 1, comprising said filling agent in an amount between 5 wt % and 25 wt %.

5. The additive according to claim 1, comprising said reinforcing agent in an amount between 8 wt % and 50 wt %.

6. The additive according to claim 1, wherein said anchoring, structuring, filling and reinforcing agents are mixed together dry.

7. The additive according to claim 1, wherein the additive is added to an aqueous-phase decorative paint product via slow mechanical mixing.

8. An aqueous-phase decorative paint product comprising the additive according to claim 1.

9. The decorative paint product according to claim 8, further comprising colored pigments.

10. The aqueous-phase decorative paint product according to claim 8, comprising said additive in an amount between 15 wt % to 75 wt %.

11. A predispersion composition (B) for use in combination with the aqueous-phase decorative paint additive according to claim 1, wherein the predispersion composition comprises:

water as required a preserving agent comprising at least one selected from the group consisting of:
A) mixture of 5-chloro-2-methyl-4-isothiazolin-3-one and 2-methyl-4-isothiazolin-3-one;
B) mixture of chlorinated isothiazolinone and non-chlorinated isothiazolinone with the addition of hemiformal;
C) solution of derivatives of isothiazolinone, 12-hydroxy-5,8,11-trioxydodecane, 1,3-bis-(hydroxymethyl), urea, 1,6-dihydroxy-2,5-dioxyhexane; and
D) 1-(3-chloroallyl)-3,5,7-triazo-1-azonio-adamantane chloride; or mixtures thereof;

an antifoaming agent comprising at least one selected from the group consisting of:
A) paraffin mineral oils in combination with hydrophobic polysiloxane polyether copolymer;
B) emulsions of modified polysiloxane;
C) modified polyalkoxyethers in paraffin oil; and
D) emulsions of a hydrophobic polysiloxane polyether copolymer; or mixtures thereof;

a thickening agent comprising at least one selected from the group consisting of:
A) hydrophobically modified non-ionic hydroxyethyl cellulose polymer;
B) hydroxypropylmethyl cellulose;
C) hydrophilic colloidal xanthan gum; and
D) sodium carboxymethyl cellulose; or mixtures thereof;

a metallic pigment comprising at least one selected from the group consisting of:
A) gold metallic pigment with fine particles;
B) silver metallic pigment with fine particles;
C) cold metallic pigment with large particles;
D) silver metallic pigment with large particles;
E) copper metallic pigment; and
F) bronze metallic pigment; or mixtures thereof;

a wetting agent comprising at least one selected from the group consisting of:
A) solution of an alkyl ammonium salt of a polyfunctional polymer;
B) solution of an unsaturated polycarboxylic acid of high molecular weight;
C) solution of a polycarboxylic acid with a silicone polymer;
D) polyglycol esters of fatty acids; and
E) ammonium salts of a polyacrylic acid of low molecular weight; or mixtures thereof; and a dispersing agent comprising at least one selected from the group consisting of:
A) sodium salts of polycarboxylic acids;
B) ammonium salts of a carboxylic acid;
C) aminomethyl propanol; and
D) acrylic linear polymers; or mixtures thereof.

12. The predispersion composition according to claim 11, comprising said preserving agent (B) in an amount between 0.3 wt % and 3 wt %.

13. The predispersion composition according to claim 11, comprising said antifoaming agent in an amount between 0.1 wt % and 1.2 wt %.

14. The predispersion composition according to claim 11, comprising said thickening agent in an amount between 0.5 wt % and 5 wt %.

15. The predispersion composition according to claim 11, comprising said metallic pigment in an amount between 1 wt % and 36 wt %.

16. The predispersion composition according to claim 11, comprising said wetting agent in an amount between 0.1 wt % and 1.5 wt %.

17. The predispersion composition according to claim 11, comprising said dispersing agent in an amount between 0.1 wt % and 1.5 wt %.

18. The predispersion composition according to claim 11, further comprising colored pigments.

19. An aqueous-phase decorative paint product comprising the predispersion composition according to claim 11.

20. The aqueous-phase decorative paint product according to comprising said predispersion composition in an amount between 15 wt % and 75 wt %.

* * * * *